United States Patent [19]

Toshiro et al.

[11] Patent Number: 4,469,925
[45] Date of Patent: Sep. 4, 1984

[54] INDUCTIVE HEATING DEVICE UTILIZING A HEAT INSULATOR

[75] Inventors: Akira Toshiro, Kagawa; Yoshihiko Osaki, Hyogo, both of Japan

[73] Assignees: Mitsubishi Denki Kabushiki Kaisha, Tokyo; Toyo Tanso Co., Ltd., Osaka, both of Japan

[21] Appl. No.: 365,848

[22] Filed: Apr. 5, 1982

[30] Foreign Application Priority Data

Apr. 7, 1981 [JP] Japan .................................. 56-53362

[51] Int. Cl.³ .............................................. H05B 6/24
[52] U.S. Cl. .......................... 219/10.49 R; 219/10.67; 373/155; 373/157
[58] Field of Search .................... 219/10.49 R, 10.75, 219/10.67, 10.79, 531; 373/151, 155, 157, 162, 164; 428/920; 252/62

[56] References Cited

U.S. PATENT DOCUMENTS

| | | | |
|---|---|---|---|
| 1,756,457 | 4/1930 | Fourment | 219/10.75 |
| 1,997,741 | 4/1935 | Northrup | 219/10.49 R |
| 2,743,306 | 4/1956 | Mark, Jr. | 373/157 |
| 4,321,446 | 3/1982 | Ogawa et al. | 219/10.49 R |

Primary Examiner—Roy N. Envall, Jr.
Assistant Examiner—Philip H. Leung
Attorney, Agent, or Firm—Sughrue, Mion, Zinn, Macpeak and Seas

[57] ABSTRACT

An inductive heating device for heating a workpiece made of carbon has a heating coil disposed so as to surround the carbon workpiece. A first and second heat insulating layer is interposed between the workpiece and the heating coil, with the first layer being made of a carbon powder and the second layer being made of a carbon and silica powder mixture. A high frequency electrical source is used to drive the heating coil, which causes an eddy current to be induced in the workpiece, thus heating the workpiece. The first and second heat insulating layers prevent the surface of the workpiece from oxidizing and minimize heat loss from the workpiece during the heating thereof.

3 Claims, 7 Drawing Figures

INDUCTIVE HEATING DEVICE UTILIZING A HEAT INSULATOR

BACKGROUND OF THE INVENTION

1. Field of the Invention

The present invention relates to an inductive heating device for heating workpieces at rest and, in particular, to a device for graphitizing carbon.

2. Description of the Prior Art

A conventional heating device for heating workpieces and, in particular, for graphitizing carbon is shown in FIG. 1. In FIG. 1, electrodes 2 are placed on opposite sides of pieces of carbon 21. A power source 6 supplies electric current to the electrodes 2 and the pieces of carbon 21. The current is passed between the electrodes 2 and, therefore, the current is also passed through the pieces of carbon 21. A first insulator 3, comprising carbon powder "A", is used to fill the spaces between the pieces of carbon 21, the carbon powder "A" facilitating the application of current to the pieces of carbon 21. A second insulator 4, comprising carbon powder "B", is used to cover the top of the electrodes 2 and the pieces of carbon 21 to insulate thermally the top of the heating device. A refractory member 5 is placed below the electrodes 2, the pieces of carbon 21 and the carbon powder "A" to insulate thermally the bottom of the heating device.

In the conventional heating device, in order to supply current uniformly to the pieces of carbon 21, the first insulator 3, comprising the carbon powder "A", is used to fill the gaps between the pieces of carbon 21. In this case, the spatial distribution of the current between the electrodes 2 varies, the amount of variation depending on how well the gaps between the pieces of carbon 21 are filled with the carbon powder "A". In addition, a long period of time is required for applying current to adequately heat the pieces of carbon 21. Such a lengthy current application time results in excessive heat loss through the electrodes 2. For these reasons, the ratio of electric power applied by the power source 6 to the sum of the surface areas of the pieces of carbon 21 to be heated (hereinafter referred to as "a surface power density") is, in general, set to about 3.5 W/cm$^2$.

SUMMARY OF THE INVENTION

In view of the foregoing, an object of the present invention is to provide an inductive heating device suitable for graphitization. The device has a heating coil which surrounds a workpiece to be heated and a heat insulating layer interposed between the workpiece to be heated and the heating coil. As current flows through the heating coil, an eddy current is induced in the peripheral portion of the workpiece to be heated, thus heating the workpiece. The heat insulating layer reduces the dissipation of heat from the workpiece being heated, and also prevents the surface of the workpiece from oxidizing. In a preferred embodiment, the heat insulating layer comprises two layers, the first being made of a carbon powder, and the second being made of a carbon and silica powder mixture. Using the device of the present invention, the workpiece can be heated to a temperature of 2,200° C. or higher, in a short period of time, with a high surface power density.

DESCRIPTION OF THE PREFERRED EMBODIMENTS

A first embodiment of the heating device of the present invention will be described below with reference to FIGS. 2 and 3.

Figure 1:
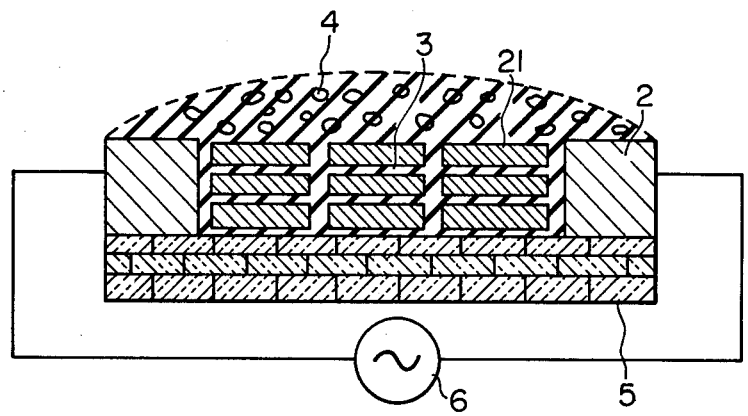
FIG. 1 is a sectional view of a conventional inductive heating device.
Figure 2:
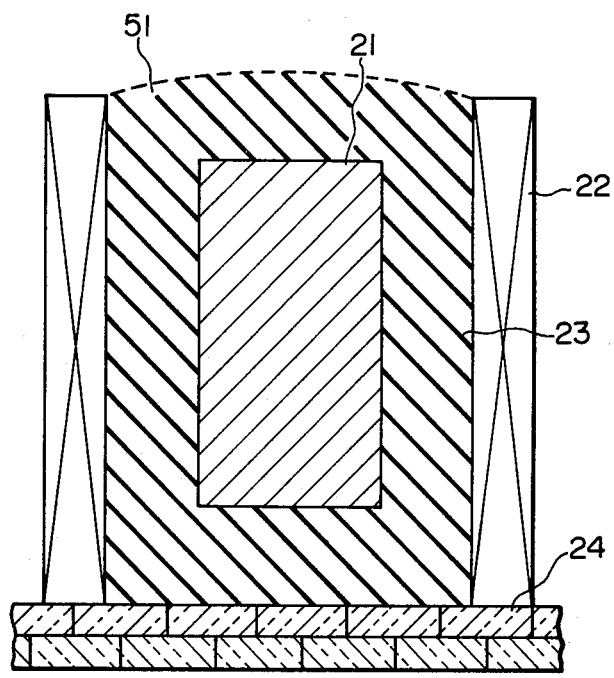
FIG. 2 is a sectional view showing a first embodiment of the present invention.
Figure 3:
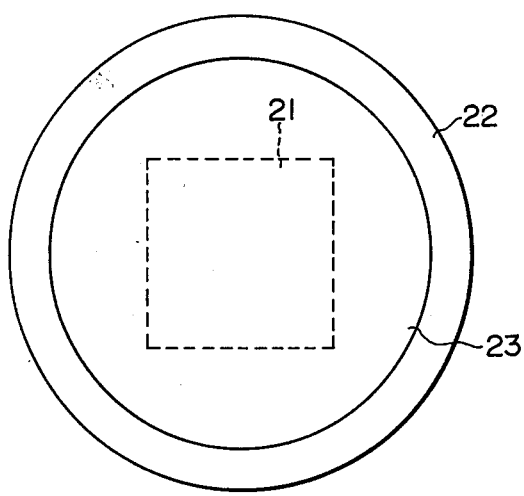
FIG. 3 is a top view of the device shown in FIG. 2.

As shown in FIGS. 2 and 3, an inductive heating coil 22 is arranged around a workpiece 21 which is made of carbon. The space between the coil 22 and the workpiece 21 is filled with a heat insulating material 23, such as carbon powder "B". The coil 22, the workpiece 21 and the heat insulating material 23 are placed on a refractory member 24, made of refractory bricks or the like. The heating coil 22 is then connected to an AC power source (not shown).

In this embodiment, the inductive heating coil 22 surrounds the workpiece 21. As current flows in the heating coil 22, an eddy current is induced in the peripheral portion of the workpiece 21 to be heated. The permeation depth of the eddy current varies, depending on the geometry involved and the amount of current flowing in the heating coil 22. The core of the workpiece 21 is then heated by the conduction of heat from the peripheral portion of the workpiece.

Figure 4:
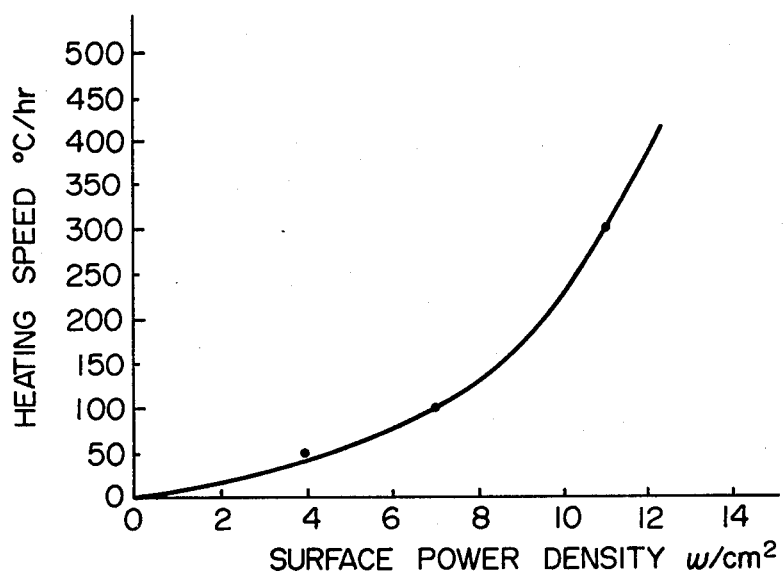
FIG. 4 is a diagram indicating heating speed versus surface power density using the device of FIGS. 2 and 3.
Figure 5:
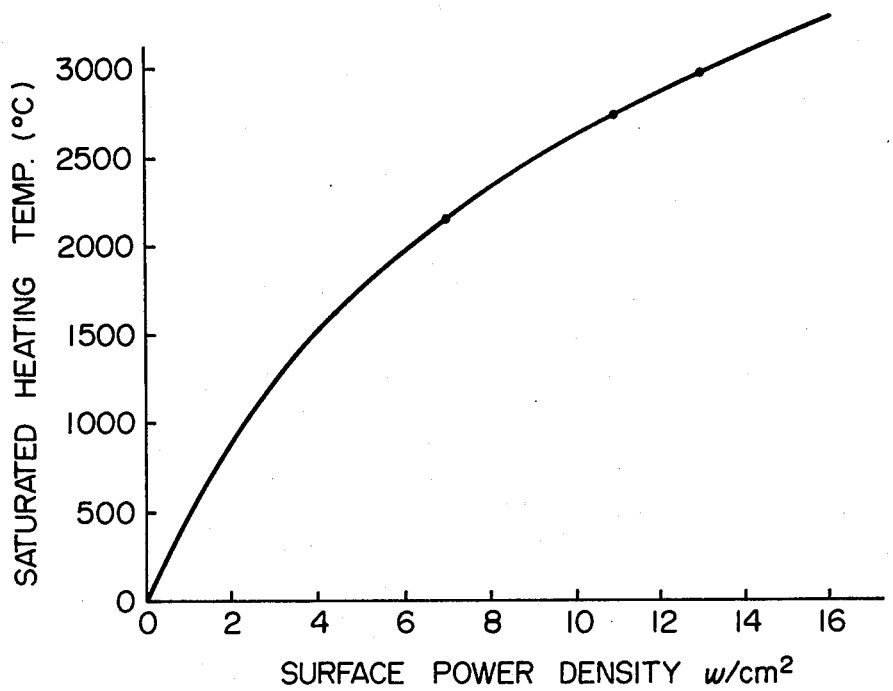
FIG. 5 is a diagram indicating saturated heating temperature versus surface power density of the device of FIGS. 2 and 3.

In order to prevent the dissipation of heat from the peripheral portion of the workpiece and to prevent the peripheral portion of the workpiece 21 from oxidizing, the workpiece 21 is surrounded by the heat insulating material 23, such as carbon powder "B". Heating temperatures and saturated temperatures, as indicated in the graphical representations in FIGS. 4 and 5, can be obtained using the above-described heating and insulating method. As can be seen, a surface power density of 7.0 W/cm$^2$, or more. A surface power density of 7.0 W/cm$^2$ is necessary for maintaining a heating temperature of 2,200° C. With a surface power density in excess of 20 W/cm$^2$, the heating speed is extremely high and, therefore, the workpiece may be cracked by thermal shock.

The heating device and method described above is suitable for manufacturing silicon carbonate.

In operation, when an alternating current is applied to the inductive heating coil 22 and the temperature of the workpiece 21 increases, heat flows from the workpiece 21 to the heating coil 22, the refractory member 4, and the top portion 51. Therefore, a loss of heat occurs. In order to limit the loss of heat, the heat insulating material 23 is made of carbon powder, carbon black or charcoal powder. This type of heat insulating material can sufficiently withstand the highest heat treatment temperature (about 3,000° C.) which is applied to the workpiece 21.

However, when the temperature of the workpiece 21 exceeds about 2,000° C., the electrical resistance of the heat insulating material 23, which is in contact with the workpiece, is considerably decreased; e.g., the heat insulating material 23 becomes electrically conductive. As a result, an eddy current also flows in the heat insulating material 23, thus resulting in a loss of electrical power. Accordingly, when the workpiece 21 is made of carbon, the temperature rise is generally limited to 2,900° C. with an electric power consumption of 6.0 KWH per kilogram of the sintered carbon product.

In addition, after heat treatment, the workpiece must stand for a length of time sufficient to allow it to cool. However, since the workpiece 21 and the heat insulating material 23 have a low thermal conductivity, it takes five to ten days to cool the workpiece to about 400° C., the highest temperature at which the graphitized carbon can be removed from the device without oxidizing in the air.

Figure 6:
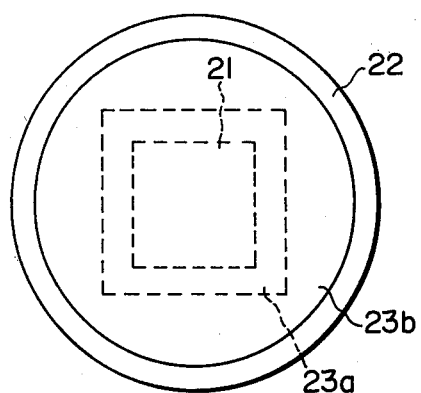
FIG. 6 is a top view of a second embodiment of the device of the invention having two heat insulating layers.
Figure 7:
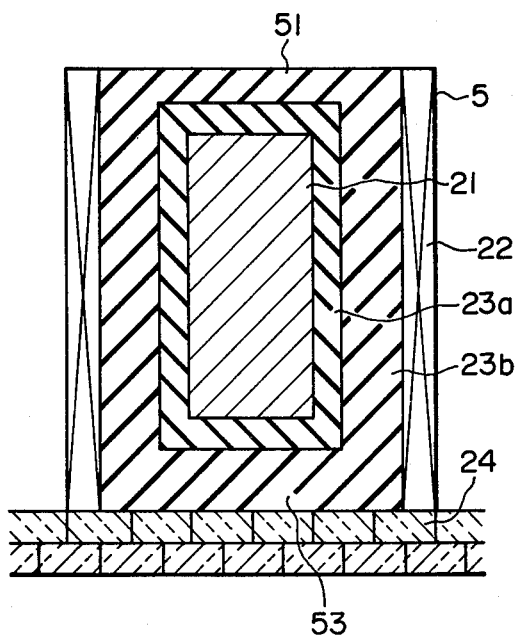
FIG. 7 is a sectional view of the device of FIG. 6.

To improve the utilization of the device of the present invention, further modifications can be made, as best illustrated in FIGS. 6 and 7. In the device of FIGS. 6 and 7, the heat insulating material 23 has been replaced by two heat insulating layers 23a and 23b. The first heat insulating layer 23a is made of carbon powder packed to a thickness of 5 to 15 cm. The second heat insulating layer 23b is made of a mixture of carbon powder and silica powder, and this layer is dielectric. The second heat insulating layer 23b surrounds the first heat insulating layer 23a. A few concrete examples of the device of FIGS. 6 and 7 are described below:

CONCRETE EXAMPLE 1

In the inductive heating device of FIGS. 6 and 7 for graphitization, as described above, the first heat insulating layer 23a was made of carbon black and had a thickness of 10 cm. For the second heat insulating layer 23b, 50 parts by weight of petroleum coke, consisting of 25% petroleum coke by weight having a grain size of less than 100 mesh, and 75% petroleum coke by weight having a grain size of 32 to 100 mesh, was uniformly mixed with 50 parts by weight of silica grain having a purity of more than 95% and a grain size of 32 to 100 mesh. The resulting mixture had an electrical resistivity of more than 1 $\Omega$-cm under a pressure of 1 kg/cm$^2$, and was packed into the device to an average thickness of 15 cm to provide the second heat insulating layer 23b. In a region 51 above the workpiece 21 to be heated, the thickness of the first heat insulating layer 23a was 15 cm, and the thickness of the second heat insulating layer 23b was 30 cm. In a region 53 below the workpiece 21, the thickness of the first heat insulating layer 23a was 5 cm, and the thickness of the second heat insulating layer 23b was 30 cm. In the device thus constructed, when the workpiece, a sintered carbon product, was heated by connecting the inductive heating coil 22 to a high frequency electric source, the temperature of the workpiece 21 reached 3,000° C., with the electric power per kilogram of the workpiece being 3.5 KWH. It took 72 hours to cool the workpiece to 400° C.

CONCRETE EXAMPLE 2

The first heat insulating layer 23a was made of a heat insulating material, which was carbon powder having a grain size of less than 32 mesh. The other components were exactly the same as those of Concrete Example 1. A sintered carbon product workpiece was heated in the same manner as in Concrete Example 1. In this example, however, the temperature of the workpiece reached 3,000° C. with 4 KWH electric power per kilogram of the workpiece, and it took 65 hours to cool the workpiece to 400° C.

In the above-described Concrete Examples 1 and 2, the refractory cement used for the inductive heating coil 22 was not damaged at all.

The Concrete Examples described above are provided only to aid in the understanding of the invention and, accordingly, the invention is not limited thereto or thereby. Furthermore, the application of the device is not limited only to the graphitization of carbon material.

As described above, in the device of FIGS. 6 and 7, the first heat insulating layer 23a of carbon, and the second heat insulating layer 23b of carbon and silica, are provided in such a manner that the layer 23b surrounds the layer 23a. Therefore, the drawbacks accompanying the conventional heating device are eliminated, power consumption is considerably decreased, and the percentage of utilization of the device is increased.

What is claimed is:

1. An induction heating device for heating a workpiece comprised of carbon to be graphitized upon being heated, comprising:

a first heat insulating layer radially surrounding said workpiece to be heated and in close contact therewith;

a second heat insulating layer radially disposed around the periphery of said first layer and in close contact therewith, said second heat insulating layer having an electrical resistivity greater than 1 ohm-cm and being comprised essentially of a silica powder and carbon powder mixture having a grain size between 32 mesh and 100 mesh;

a heating coil disposed around said second layer; and a high frequency electrical source connected to said heating coil, said high frequency electrical source providing an alternating current to said heating coil so that a surface power density induced in said workpiece varies between 7 W/cm$^2$ and 20 W/cm$^2$.

2. The device as claimed in claim 1, wherein said first layer is selected from the group consisting of carbon powder, carbon black, and charcoal powder.

3. The device as claimed in claim 1, wherein said second layer is between 5 and 15 cm thick.

* * * * *